United States Patent
Le Gall et al.

(10) Patent No.: US 9,068,684 B2
(45) Date of Patent: Jun. 30, 2015

(54) SEALED STOPPER FOR AN OPENING IN A TUBING FOR JOINING A CHAMBER AND A PIPING, PARTICULARLY IN THE STEAM GENERATOR OF A NUCLEAR PRESSURISED WATER REACTOR

(75) Inventors: Lionel Le Gall, Villeurbanne (FR); Pierre Chevalier, Lyons (FR); Guillaume Ruiz, Bruges (FR); Blaise Carles, Billere (FR)

(73) Assignee: AREVA NP, Courbevoie (FR)

( * ) Notice: Subject to any disclaimer, the term of this patent is extended or adjusted under 35 U.S.C. 154(b) by 1030 days.

(21) Appl. No.: 13/141,296

(22) PCT Filed: Dec. 17, 2009
(Under 37 CFR 1.47)

(86) PCT No.: PCT/FR2009/052589
§ 371 (c)(1),
(2), (4) Date: Jul. 25, 2012

(87) PCT Pub. No.: WO2010/072949
PCT Pub. Date: Jul. 1, 2010

(65) Prior Publication Data
US 2012/0279965 A1    Nov. 8, 2012

(30) Foreign Application Priority Data
Dec. 22, 2008    (FR) ...................................... 08 58950

(51) Int. Cl.
| F16L 55/10 | (2006.01) |
| F16L 55/11 | (2006.01) |
| F16J 13/02 | (2006.01) |
| F16J 13/12 | (2006.01) |
| F16J 13/14 | (2006.01) |
| F16L 55/132 | (2006.01) |

(Continued)

(52) U.S. Cl.
CPC ................. *F16L 55/11* (2013.01); *F16J 13/02* (2013.01); *F16J 13/12* (2013.01); *F16J 13/14* (2013.01); *F16L 55/1108* (2013.01); *F16L 55/132* (2013.01); *F22B 37/14* (2013.01); *G21C 13/06* (2013.01); *G21D 1/006* (2013.01); *Y02E 30/40* (2013.01)

(58) Field of Classification Search
CPC ........ F22B 37/222; Y02E 30/40; F16J 13/02; F16J 13/12; F16J 13/14
USPC .............................. 138/89, 90; 376/260, 204
See application file for complete search history.

(56) References Cited

U.S. PATENT DOCUMENTS

| 2,607,370 A | 6/1948 | Anderson et al. |
| 4,312,708 A * | 1/1982 | Leslie ........................... 376/203 |

(Continued)

FOREIGN PATENT DOCUMENTS

| EP | 0170789 | 2/1986 |
| EP | 0187707 | 7/1986 |
| FR | 2708080 | 7/2011 |

*Primary Examiner* — Paul R Durand
*Assistant Examiner* — Jeremy W Carroll

(57) ABSTRACT

A sealed stopper for an opening in a tubing for joining a chamber and a piping including a fastening ring is provided. The stopper includes a rigid bearing plate and a sealing member carried by the bearing plate, and includes a seal having a planar and flexible central portion with a reduced thickness extending below the bearing plate and a peripheral portion radially deformable by a central expander of the peripheral portion against the inner surface of the fastening ring.

11 Claims, 8 Drawing Sheets

(51) Int. Cl.
*F22B 37/14* (2006.01)
*G21C 13/06* (2006.01)
*G21D 1/00* (2006.01)

(56) References Cited

U.S. PATENT DOCUMENTS

| | | | |
|---|---|---|---|
| 4,482,076 A * | 11/1984 | Wentzell | 220/232 |
| 4,519,519 A * | 5/1985 | Meuschke et al. | 220/211 |
| 4,671,326 A * | 6/1987 | Wilhelm et al. | 138/93 |
| 4,682,630 A * | 7/1987 | Schukei | 138/89 |
| 4,690,172 A * | 9/1987 | Everett | 138/89 |
| 4,957,215 A * | 9/1990 | Evans et al. | 220/232 |
| 4,959,192 A * | 9/1990 | Trundle et al. | 376/260 |
| 5,007,460 A * | 4/1991 | Zezza et al. | 138/89 |
| 5,032,350 A * | 7/1991 | McDonald et al. | 376/260 |
| 5,171,514 A * | 12/1992 | Veronesi et al. | 376/204 |
| 5,238,054 A * | 8/1993 | Ritz et al. | 165/71 |
| 7,464,727 B1 | 12/2008 | Larson et al. | |

* cited by examiner

SEALED STOPPER FOR AN OPENING IN A TUBING FOR JOINING A CHAMBER AND A PIPING, PARTICULARLY IN THE STEAM GENERATOR OF A NUCLEAR PRESSURISED WATER REACTOR

The present invention concerns a sealed stopper to plug an opening of tubing connecting a chamber with piping, and more particularly an opening of tubing connecting a plenum of a steam generator of a pressurised water nuclear reactor with piping of the primary circuit.

BACKGROUND

Pressurised water nuclear reactors comprise steam generators which ensure the heating and vaporisation of feed water via the heat conveyed by the pressurised water used to cool the core of the reactor.

Pressurised water reactors, on each of their primary branches, comprise a steam generator having a primary part in which the pressurised coolant water of the reactor circulates, and a secondary part receiving the feed water which is heated and gradually vaporised and leaves the secondary part of the steam generator in the form of steam which is sent to a turbine associated with the nuclear reactor to drive an alternator producing electric current.

Said steam generators comprise an outer shell called a pressure shell of general cylindrical shape arranged with its axis positioned vertically and secured to a substantially horizontal tube sheet whose lower face or inlet face forms a wall of the plenum of the steam generator fed with pressurised water forming the primary fluid.

This plenum generally of semi-spherical shape has openings at which tubing is welded connecting with the hot branch and cold branch of a loop of the primary circuit of the nuclear reactor.

Nuclear reactors must be periodically shut down to carry out maintenance, replacement and repair operations, e.g., for refuelling operations.

This shutdown period is also used for maintenance of the steam generators.

To carry out some maintenance or repair operations on the steam generators, during shutdown periods of the nuclear reactor, it may be necessary for servicing technicians to enter inside the plenum.

The primary circuit and the vessel of the nuclear reactor are filled with water during maintenance operations on the nuclear reactor, which means that it is necessary to drain the plenum and then to shut off the primary circuit before it is possible for servicing technicians to work inside this plenum.

To enable these operators to carry out servicing inside the plenum, devices are known for the sealed plugging of the tubing of this plenum connecting with the primary circuit, these devices comprising stoppers also known as nozzle dams placed inside the tubing of the plenum prior to servicing.

To place this stopper in position, a fastening ring of the stopper is welded inside the plenum around the opening of the tubing, in the part thereof that opens onto the inside of the chamber in a coaxial arrangement relative to the tubing.

The stopper also comprises a sealing member intended to be applied onto the inner surface of the fastening ring and/or of the opening of the tubing.

It is generally necessary to form the stopper in several parts which are assembled inside the plenum, or in foldable form, since the stopper has to be inserted inside the plenum via a manhole whose diameter is generally smaller than the diameter of the opening of the tubing in which the stopper is placed.

For this purpose a stopper also known as a nozzle dam is known that is dish-shaped comprising a first cylindrical part closed by a base whose diameter is smaller than the inner diameter of the ring, and a second peripheral part of flat annular shape whose outer diameter is larger than the inner diameter of the ring.

In this case the seal is ensured by two inflatable, peripheral ring seals which are inserted between the inner surface of the ring and the outer surface of the cylindrical part of the stopper, when this stopper is in position, and by a static seal which comes to bear either against the inner surface of the opening of the tubing or against the upper surface of the ring and a peripheral retaining part in the form of a rim which comes to be applied against the outer surface of the fastening ring.

The holding in position of the stopper is generally ensured by securing members such as screws for example, which pass through the peripheral part of the stopper and are screwed into tapped orifices arranged in the ring.

The main disadvantage of this type of stopper lies in the fact that it requires the connecting of the seals to an inflating unit, and that it requires continuous monitoring of the inflation of the seals which guarantee the sealed plugging.

In addition, this type of stopper has proved to have mechanical resistance, and in particular resistance to temperature or to fluid pressure exerted on one side of the stopper, which may be insufficient for repeated use and use of long duration, or in the occurrence of accidental events.

SUMMARY OF THE INVENTION

The present invention may avoid these disadvantages by providing a sealed stopper for plugging the tubing which connects a chamber with piping, the stopper being reliable and easy to implement by operators inside a plenum of a steam generator, whilst reducing the servicing time for these operators in a hostile environment.

A sealed stopper is provided for plugging an opening of tubing connecting a chamber with piping, which comprises a fastening ring arranged around this connection opening of the tubing leading into the chamber and secured to the inner surface of the chamber, said stopper comprising:

a rigid bearing plate formed by a cylindrical part whose diameter is smaller than the inner diameter of the fastening ring, and a flat annular part whose diameter is larger than the inner diameter of said fastening ring, and a sealing member carried by the cylindrical part of the bearing plate, characterized in that the sealing member includes a seal comprising firstly a planar, flexible central part of narrow thickness extending underneath the cylindrical part of the bearing plate, and secondly a peripheral part deformable radially by central expansion means for expanding said peripheral part against the inner surface of the fastening ring.

According to other characteristics of one embodiment of the invention:

the peripheral part is thicker and more resistant than the central part of the seal and, together with the central part of the seal, delimits an inner housing for the expansion means, said housing being open opposite said central part, the inner housing, on the peripheral part of the seal, comprises an internal frusto-conical wall whose slope is directed towards the center of the bearing plate, the central expansion means is of conical press-fit type and comprises an expansion plate whose shape mates with the inner housing of the seal and can be moved in translation along the axis of the stopper by a control element between a passive position away from the housing and an active position inside said housing to cause radial movement of the peripheral part of the seal, the expansion plate comprises a frusto-conical, side rim whose slope is directed towards the center of the bearing plate, the upper edge of the side rim of the expansion plate has a diameter that is substantially equal to the diameter of the lower edge of the frusto-conical wall of the housing, the control element is formed of a screw system or an eccentric cam system, or a system with helical ramp, the bearing plate and the expansion plate are in composite material, each of their constituent elements comprising two substantially parallel cover skins delimiting volumes between them filled with foam or honeycomb, said volumes being delimited by transverse walls forming stiffeners, the bearing plate and the expansion plate are in a metal alloy e.g. aluminium, the bearing plate and the expansion plate are each formed of at least two hinged panels which can be folded over each other, and the bearing plate is formed of five hinged panels and the expansion plate is formed of three hinged panels.

BRIEF DESCRIPTION OF THE DRAWINGS

The invention and its advantages will be better understood on reading the following description given by way of example and with reference to the appended drawings in which.

DETAILED DESCRIPTION

Figure 1:
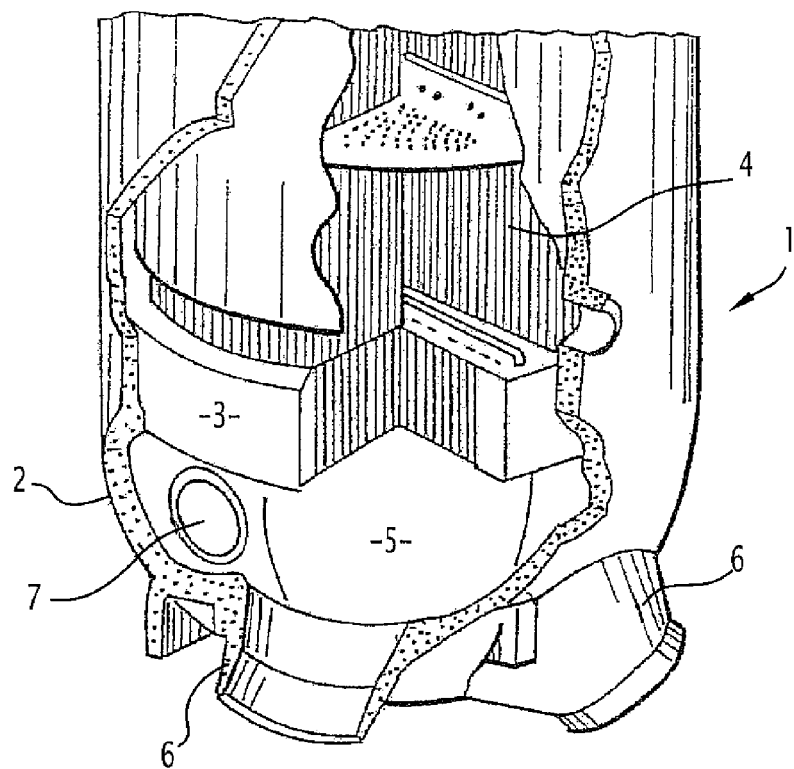
FIG. 1 is a perspective exploded view of the lower part of a steam generator with its plenum.

FIG. 1 shows the lower part of a steam generator carrying the general reference 1 and comprising the semi-spherical wall of a plenum 2. This semi-spherical wall is secured onto a tube sheet 3 in which the ends of the tubes of the bundle 4 are secured. The plenum 2 is innerly divided into two parts by a transverse partition 5.

Either side of the partition 5, openings are made in the plenum 2 in which tubing 6 is arranged connecting with two pipes of the primary circuit.

The tubing 6 ensures the feeding of pressurised water into one part of the plenum, and recovery by the other part of the plenum of the pressurised water which has circulated inside tubes of the bundle 4 of the steam generator 1.

Figure 2:
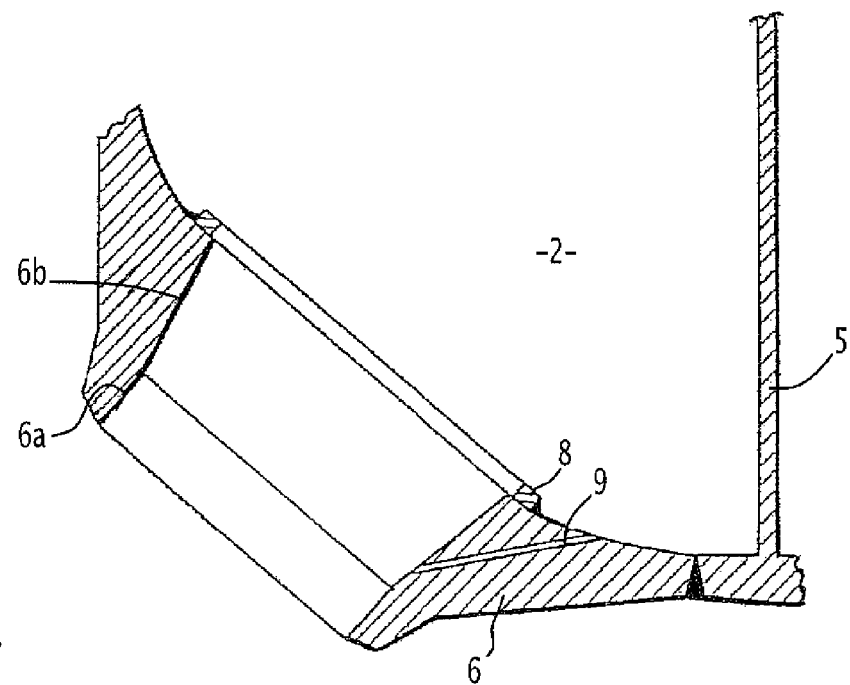
FIG. 2 is a cross-sectional view of tubing of the plenum of a steam generator comprising a fastening ring for securing a stopper conforming to the invention.

The wall of the plenum 2 also has manways 7 leading into each of the compartments separated by the partition 5. As can be seen FIG. 2, the tubing 6 arranged at the openings passing through the plenum 2 comprises a bore of cylindrical-frusto-conical shape comprising a first cylindrical part 6a extended by a second frusto-conical part 6b which flares outwardly in the direction of the inside of the plenum 2.

For servicing inside the plenum 2, it is possible for servicing operators to enter via the manholes 7 into the inside of either one of the compartments of the plenum 2 separated by the partition 5. During such servicing, the primary circuit is generally filled with water which means that it is necessary to ensure the sealed plugging of the flared nozzle of the tubing 6 before servicing operations can begin.

For this purpose, a fastening ring 8 is fixed, e.g., by welding to the inner surface of the plenum 2, in coaxial arrangement relative to the opening of the tubing 6 in the portion where the flared part of the tubing 6 opens into the inside of the plenum 2.

The tubing 6 is also pierced with a channel 9 used to drain the plenum completely after it has been shut off from the primary circuit by a stopper secured to the fastening ring 8.

Figure 3:
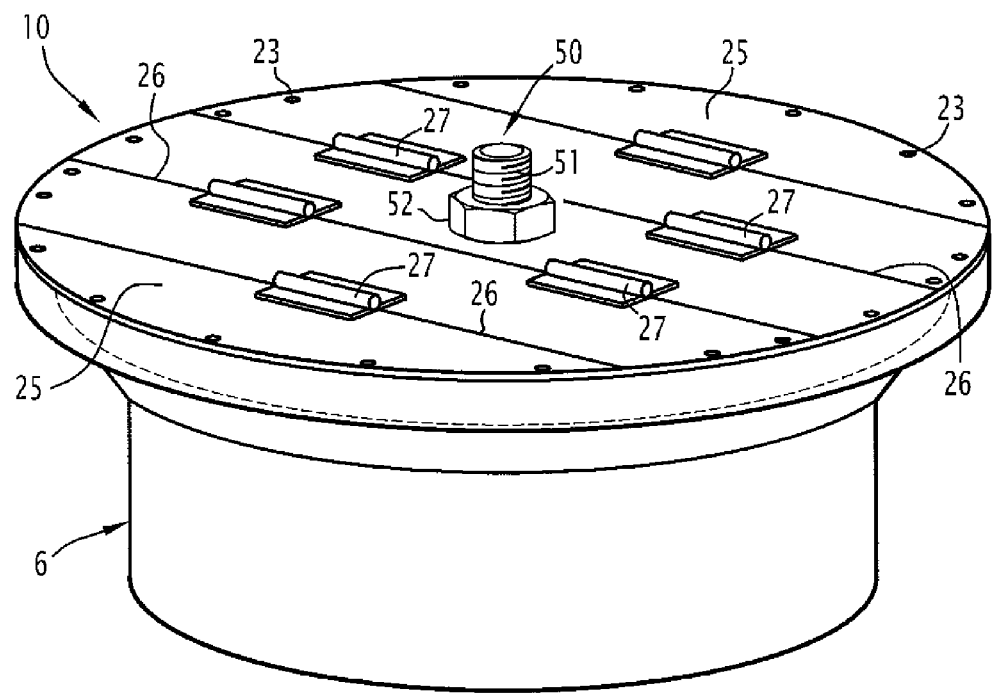
FIG. 3 is a schematic perspective view of the stopper conforming to the invention.
Figure 4:
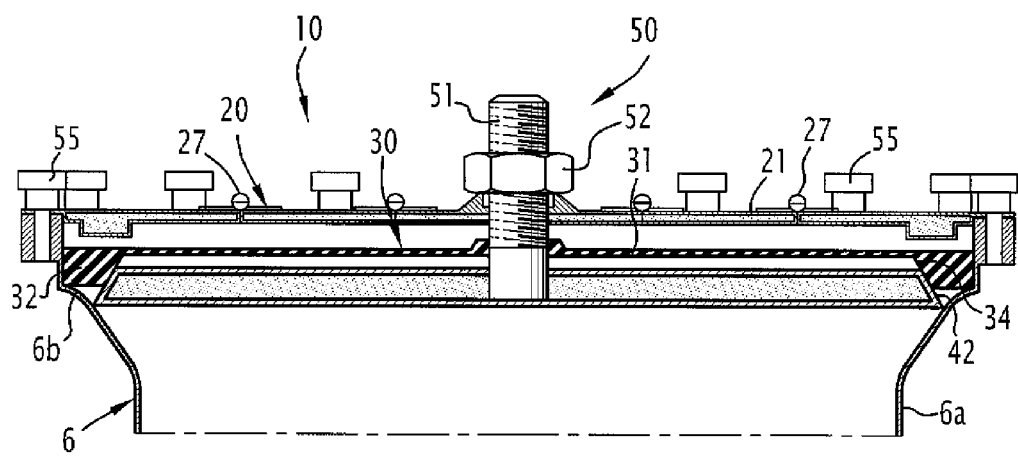
FIGS. 4 and 5 are schematic cross-sectional views in the vertical plane of the stopper, respectively before and after expansion of the sealing member.
Figure 5:
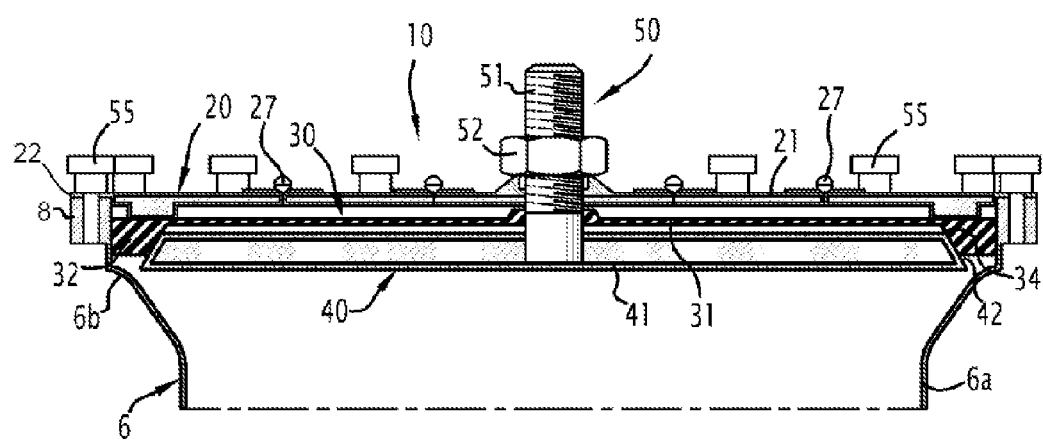

The stopper illustrated as a whole in FIGS. 3 to 5 must be inserted inside the plenum 2 via the manway 7 leading into the plenum.

As illustrated FIGS. 4 and 5, the stopper carries the general reference 10 and comprises four main parts, namely:
a bearing plate 20,
a sealing member 30,
central means 40 for radial expansion of the sealing member 30, and
a control element 50 to control the radial expanding of said sealing member 30.

Therefore, the three elements formed of the bearing plate 20, the sealing member 30 and the central expansion means 40 are superimposed, the bearing plate 20 being arranged above the sealing member 30 and this sealing member 30 being arranged above the expansion means 40.

Figure 6:
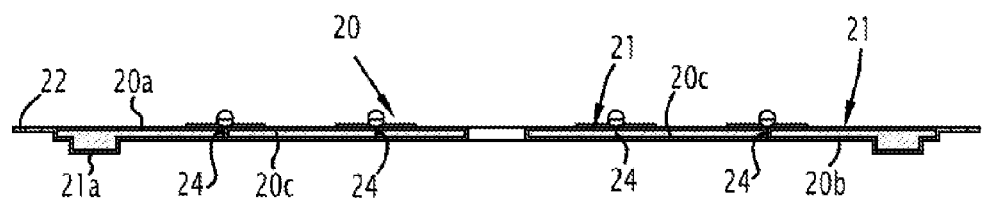
FIG. 6 is a schematic cross-sectional view in the vertical plane of the stopper bearing plate.

The bearing plate 20, respectively illustrated in perspective in FIG. 3 and in vertical cross-section in FIG. 6, is formed by a cylindrical part 21 whose diameter is smaller than the inner diameter of the fastening ring 8, and by a flat annular part 22 that is disk-shaped whose diameter is larger than the inner diameter of said fastening ring 8. The annular part 22 comprises uniformly distributed openings 23 (FIG. 3) through which the securing members are passed such as screws cooperating with threaded openings arranged in said fastening ring 8.

The inner side of the cylindrical part 21 comprises a ring 21a (FIG. 6) which forms a bearing surface for the sealing member 30 when in expansion position, as will be seen below.

To meet the constraints of weight and volume in order to pass the bearing plate 20 through the manway 7, this bearing plate 20 is made in lightweight material and in at least two hinged panels which can folded over each other.

Preferably the bearing plate 20 is in composite material comprising two substantially parallel, cover skins 20a and 20b. For example the skins 20a and 20b are formed of fabric produced by woven carbon, aramid or carbon-aramid fibres. These skins 20a and 20b determine volumes 20c between them which are delimited by transverse walls 24 forming stiffeners. The volumes 20c are filled with foam, preferably closed cell thermoplastic foam, or honeycomb.

To increase the impact resistance of the upper skin 20a of the bearing plate 20, this upper skin 20a can be coated with a protective material such as a polyurethane elastomer for example.

The sandwich structure of the composite material forming the bearing plate 20 allows a reduction in weight to be obtained of the order of 8 to 10 kg.

In the example of embodiment shown in the figures and more particularly in FIG. 3, the bearing plate 20 is formed of five panels 25 placed side by side and separated from each other by fold lines 26 arranged at the stiffeners 24. The panels 25 are hinged together by hinges 27 of known type or by any other suitable system.

Figure 7:
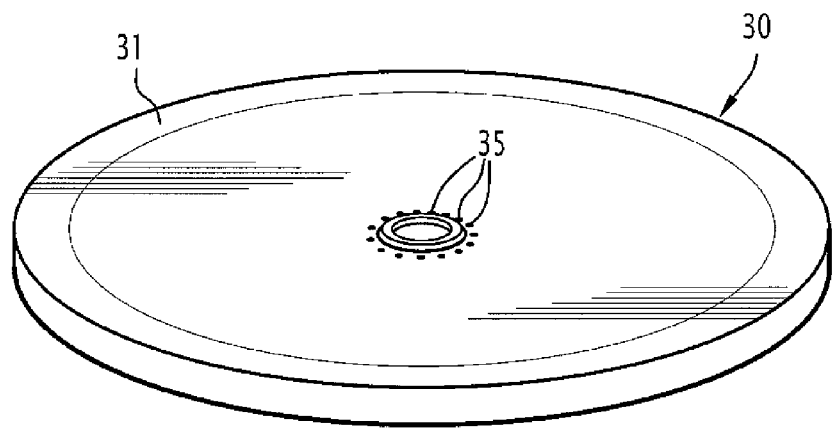
FIGS. 7 and 8 are schematic perspective and cross-sectional views respectively of the stopper sealing member.
Figure 8:
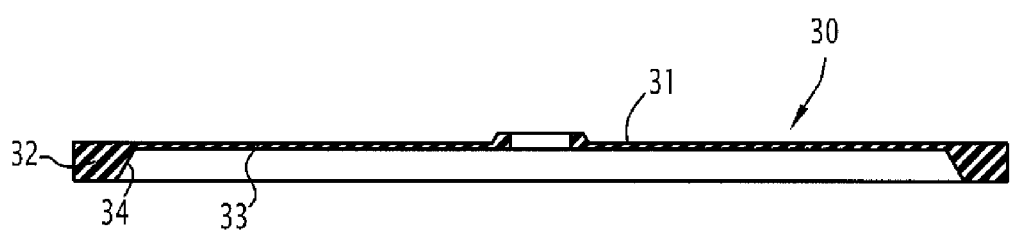

The sealing member, shown in perspective FIG. 7 and in cross-section in the vertical plane in FIG. 8, is formed of a seal 30 comprising a planar, flexible central part 31 of narrow thickness, and of a peripheral part 32 that is thicker and more resistant. This peripheral part 32 extends underneath the central part 31 and together with said central part 31 it delimits an inner housing 33 for the expansion means 40. This housing 33 is open opposite the central part 31 to allow the expansion means 40 to enter therein as will be seen below.

The inner housing 33, on the peripheral part 32 of the seal 30, comprises an inner frusto-conical wall 34 whose slope is directed towards the center of the bearing plate 20 located thereabove i.e. in the direction of the axis of the stopper 10.

Figure 9:
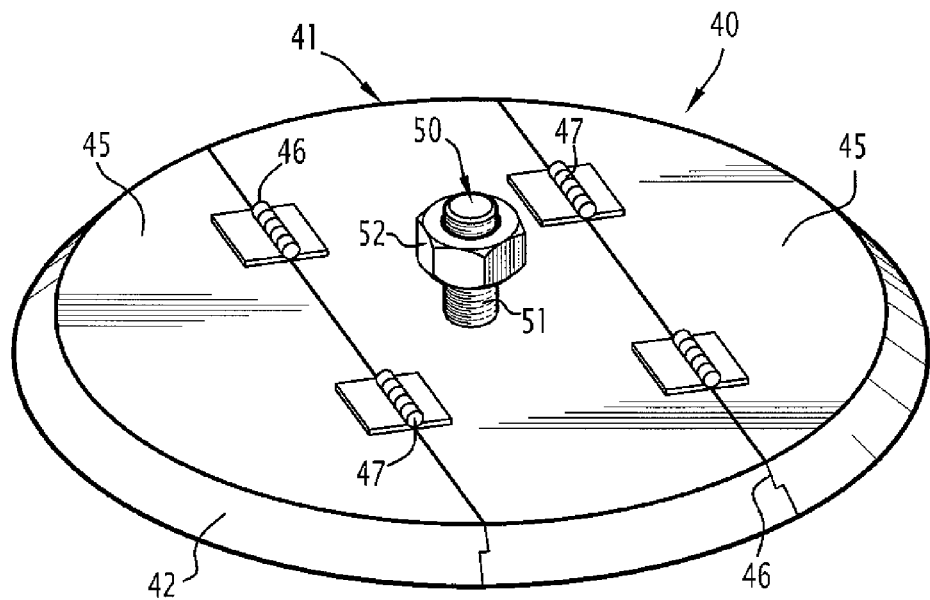
FIGS. 9 and 10 are schematic perspective and cross-sectional views respectively, in the vertical plane, of the expansion means of the stopper sealing member.
Figure 10:
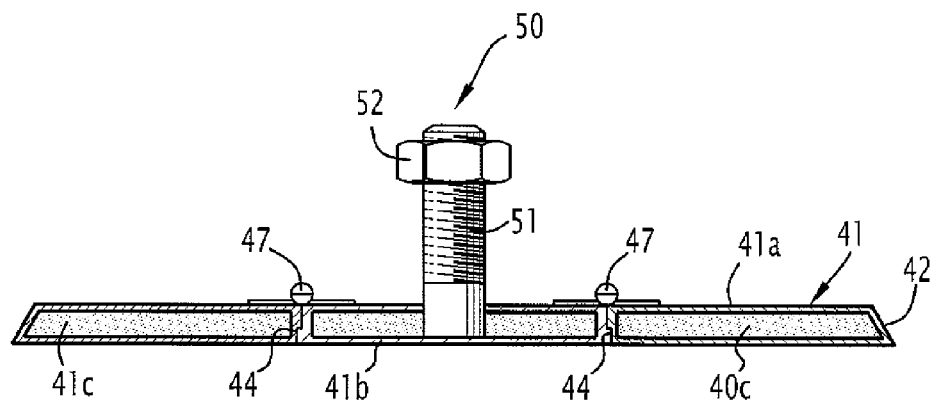

The expansion means 40, illustrated in perspective in FIG. 9 and in cross-section in the vertical plane in FIG. 10, is of conical press-fit type and comprises an expansion plate 41 whose general shape mates with the shape of the inner housing 33 of the seal 30. For this purpose, the expansion plate 41 comprises a frusto-conical side rim 42 whose slope is directed towards the center of the bearing plate 20 located above, i.e. in the direction of the axis of the stopper 10.

The upper edge of the side rim 42 of the expansion plate 41 has a diameter that is substantially equal to the diameter of the lower edge of the frusto-conical wall 34 of the housing 33 of the seal 30.

This expansion plate 41 is also made in composite material comprising two substantially parallel cover skins 41a and 41b determining volumes 40c between them delimited by transverse walls 44 forming stiffeners.

The skins 41a and 41b are preferably composed of fabric formed by woven carbon, aramid or carbon-aramid fibres.

The volumes 40c are filled with foam, preferably closed cell thermoplastic foam, or honeycomb.

The expansion plate 41 is formed of at least two panels 45 hinged together and able to be folded over one another. Preferably, and as illustrated FIG. 9, the expansion plate 41 is formed of three side-by-side panels 45 separated by fold lines 46 arranged at the stiffeners 44. These panels 45 are hinged together by means of hinges 47 of known type, or by means of any other suitable system.

According to one variant, the bearing plate 20 and the expansion plate 41 can be formed of a metal alloy such as aluminium for example.

The expansion plate 41 can be moved in translation along the axis of the stopper 10 by the control element 50, between a passive position away from the housing 33 and in which the peripheral part 32 of the seal 30 lies away from the ring 21a (FIG. 4) and an active position inside said housing 33 to cause radial movement of the peripheral part 32 of the seal 30 so as to apply and hold this peripheral part 32 against the inner surface of the fastening ring 8. In this active position, the peripheral part 32 of the seal 30 abuts the ring 21a (FIG. 5).

The control element 50, in order to move the expansion plate 41 in the direction of the bearing plate 20 and apply the peripheral part 32 of the seal 30 against the inner surface of the fastening ring 8 thereby providing ensured sealing, or to move this expansion plate 41 away from the bearing plate 20 in order to release the peripheral part 31 from the seal 30, is formed of a known, conventional screw system in the embodiment shown in the figures.

This screw system comprises a threaded rod 51 of which one end is set in the expansion plate 41, and a nut 52 is screwed onto said threaded rod 51.

The control means 50 can also be formed by an eccentric cam system or helical ramp system, or by any other suitable system which can ensure this function, such as a ball lock pins.

The positioning of the stopper 10 in the nozzle of the tubing 6 of the plenum 2 is conducted as follows.

Figure 11:
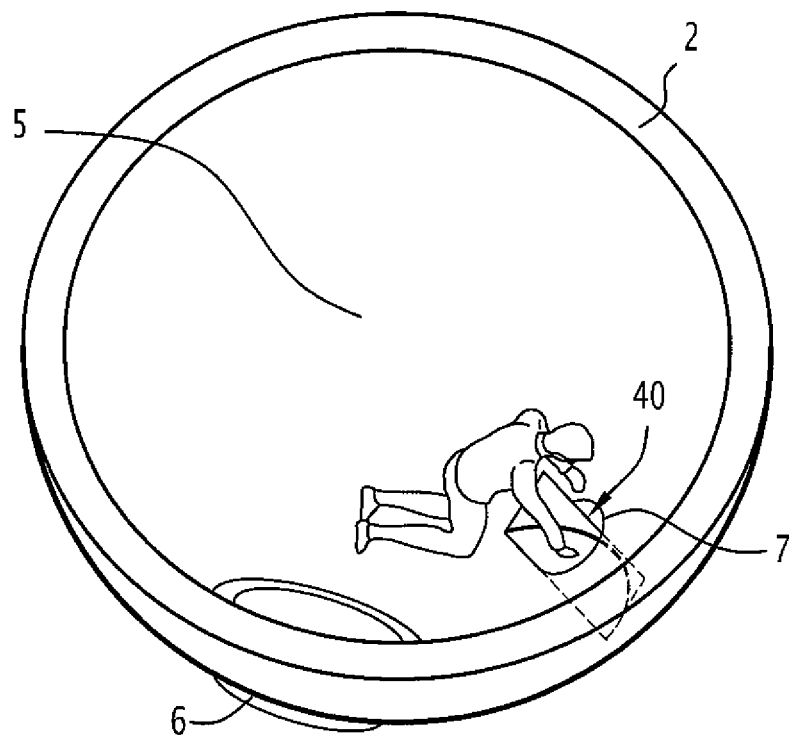
FIGS. 11 to 15 are schematic views showing the different steps for positioning and securing the stopper on tubing of the plenum of the steam generator.
Figure 12:
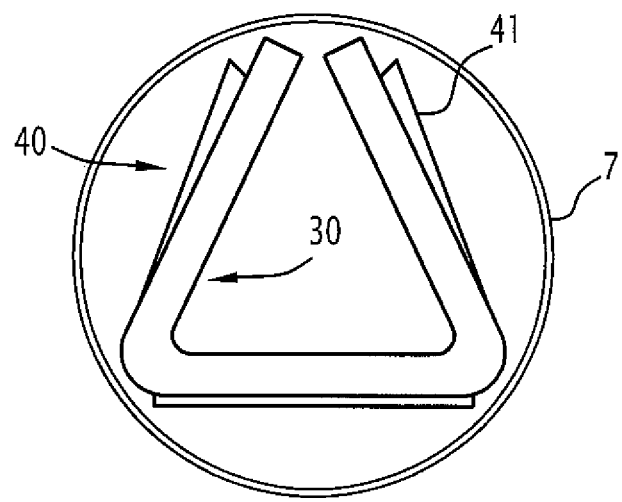

First, a servicing operator enters into the corresponding compartment of the plenum 2 as shown FIG. 11 and inserts the expansion plate 41 in folded configuration into this compartment. As shown in FIG. 12, the seal 30 is previously secured onto the expansion plate 41 e.g. by screw members passing through the central part 31 of this seal 30 via holes 35 and which are screwed into said expansion plate 41. In this configuration, the expansion plate 41 is able to pass through the manway 7 whose inner diameter is smaller than the diameter of the expansion plate 41 when deployed (FIG. 12).

Figure 13:
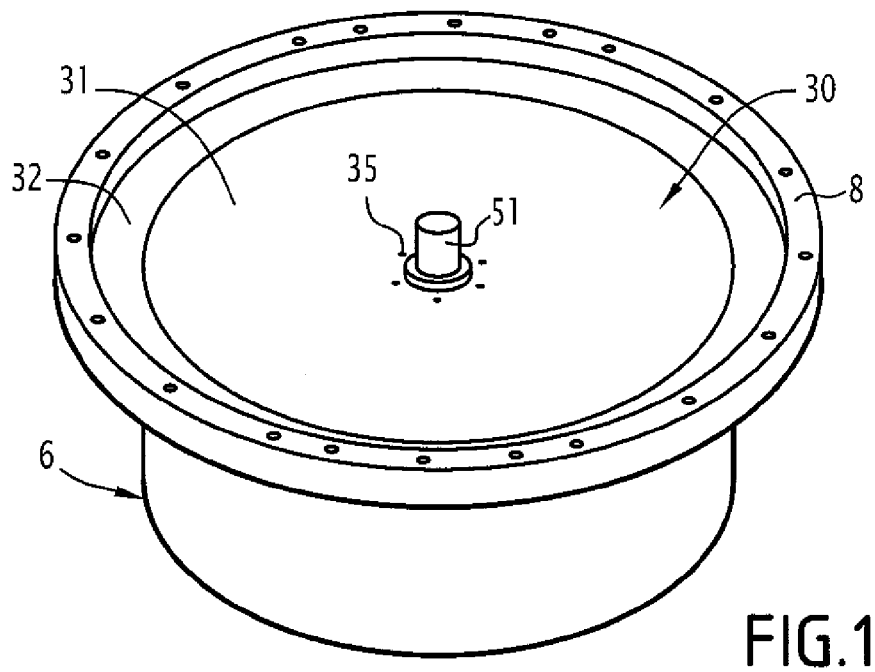

The operator then unfolds this expansion plate 41 carrying the seal 30 by causing the panels 45 to pivot around the hinges 47, and places this expansion plate 41 and the seal 30 in its deployed configuration inside the frusto-conical part 6b of the tubing 6 as shown FIG. 13.

The expansion plate 41 also carries the threaded rod 51.

The bearing plate 20 is then folded by causing the sections 25 to pivot on each other around the hinges 27, and this bearing plate 20 in said configuration is inserted through the manhole 7 and brought by the operator inside the compartment of the plenum 2.

Figure 14:
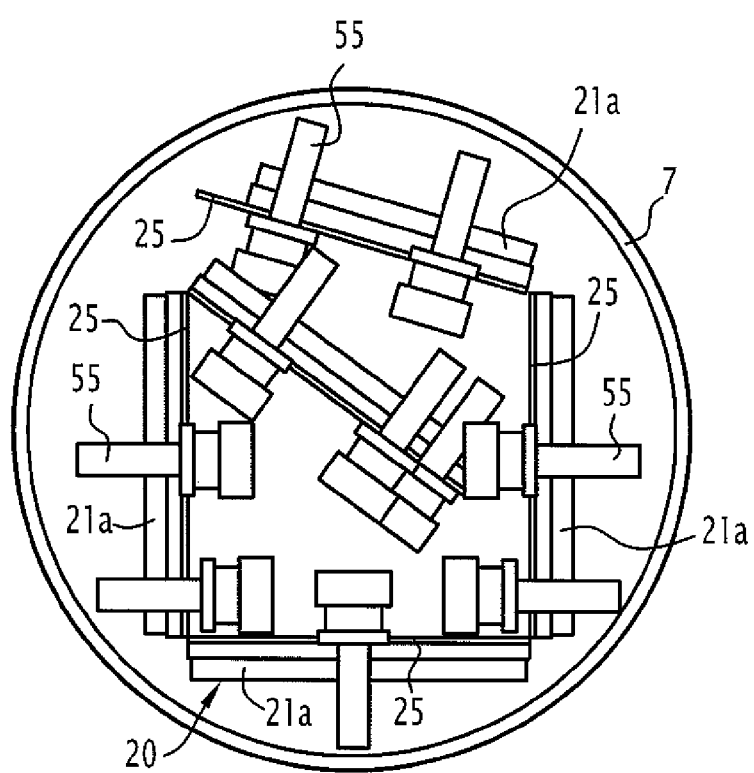

As shown FIG. 14, the bearing plate 20 carries the screw members 55 intended to secure the stopper 10 onto the fastening ring 8.

The operator then unfolds the bearing plate 20 and places this plate in position so that it bears upon the ring 8 located at the entrance to the opening of the tubing 6, over the seal 30 and expansion plate 41 that were previously placed in position. The operator next positions the nut 52 on the threaded rod 51.

Figure 15:
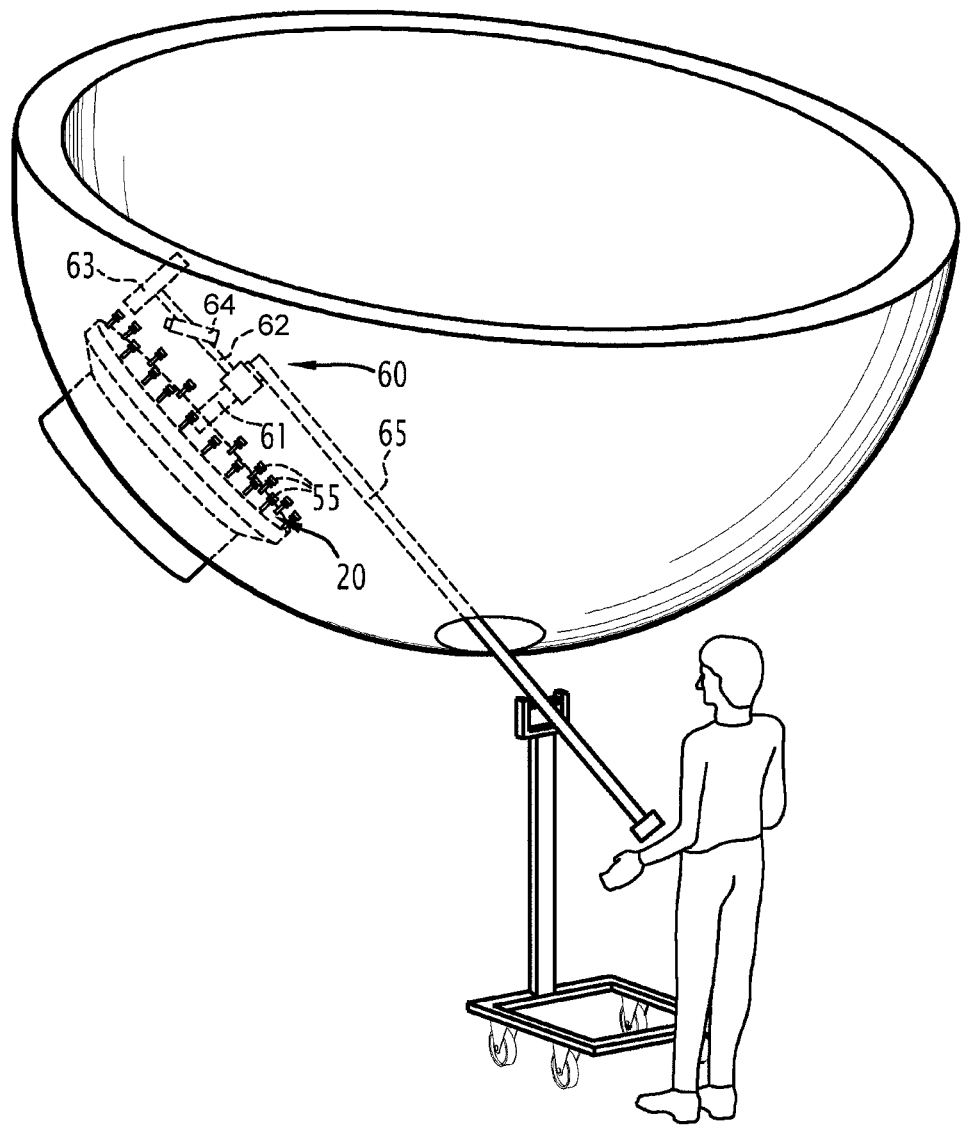

The operator center positions the screw tooling 60 on the stopper 10 as shown FIG. 15.

This screw tooling is composed of a centering foot 61 on the stopper 10 and has an arm 62 whose free end is provided with a screwing machine 63.

A camera 64 is also mounted on the arm 62 to enable an operator outside the plenum 2 to control the operations by means of display panel.

The screw tooling 60 also comprises a pole 65 so that it is possible from outside the plenum 2 to insert and position or to remove the screwing equipment 60 via the manway 7 as illustrated FIG. 15.

The angle positioning of the arm 62 carrying the screwing machine 63 and the setting in rotation of this screwing machine 63 to screw a screwing member 55 are controlled by a handle for example, located at the free end of the pole 65 and maneuvered by the operator.

When all the screw members 55 have been screwed to secure the stopper 10 on the fastening ring 8, the operator proceeds with expanding the peripheral part 32 of the seal 30. To do so, the screw system 51 is actuated by appropriate tooling which could be adapted onto the screw tooling 60 so as to cause gradual entry of the expansion plate 41 into the housing 33. This tooling can be adapted onto the screw tooling 60. Owing to the frusto-conical shapes of the inner wall 34 of the housing 33, and of the side edge 42 of the expansion plate 41, the peripheral part 32 is able to be moved radially towards the inner surface of the fastening ring 8 and comes to lie flat against the inner surface thereof so as to ensure a seal at the opening of the tubing 6 (FIG. 5). The peripheral part 32 of the seal 31 is therefore compressed via the expansion plate 41 with frusto-conical side edge.

In addition to the above-described initial expansion of the sealing member, the pressure of the fluid exerted on the expansion plate 41 which may reach 5 bars produces an additional compression force on the peripheral part 32 of the seal 30.

The stopper 10 conforming to the invention therefore allows very good sealing contact to be made on the fastening ring, and this stopper has increased resistance to pressure irrespective of the direction in which such pressure is exerted.

The stopper according to the invention has the advantage of being resistant and lightweight facilitating handling operations, and offers ease of use which reduces the servicing time of these operators in a hostile environment.

What is claimed is:

1. A sealed stopper for plugging an opening of tubing connecting a chamber with piping, a fastening ring being arranged around the opening of the tubing leading into the chamber and secured onto an inner surface of the chamber, the stopper comprising:
   a rigid bearing plate formed by a cylindrical part and a flat annular part, the cylindrical part having a diameter smaller than an inner diameter of the fastening ring, and the flat annular part having a diameter larger than the inner diameter of the fastening ring, and
   a sealing member carried by the cylindrical part of the bearing plate, the sealing member including a seal having a planar flexible central part of narrow thickness extending underneath the cylindrical part of the bearing plate and a peripheral part, the peripheral part being radially deformable by a central expander for expanding the peripheral part against the inner surface of the fastening ring, the central part being integral with the peripheral part, the peripheral part being thicker and more resistant than the central part of the seal and delimits, with the central part, an inner housing for the central expander, the inner housing being open at an end thereof that is opposite the central part.

2. The stopper as recited in claim 1 wherein the inner housing, at the peripheral part of the seal, comprises an inner frusto-conical wall having a slope directed towards a center of the bearing plate.

3. The stopper as recited in claim 2 wherein the central expander comprises an expansion plate of a shape mating with the inner housing of the seal, the expansion plate being moveable in translation along an axis of the stopper by a control element between a passive position away from the housing and an active position inside the housing to cause radial movement of the peripheral part of the seal.

4. The stopper as recited in claim 3 wherein the expansion plate comprises a frusto-conical side rim having a slope directed towards the center of the bearing plate.

5. The stopper as recited in claim 4 wherein the side rim has an upper edge, the upper edge of the side rim having a diameter substantially equal to a diameter of a lower edge of the inner frusto-conical wall of the housing of the seal.

6. The stopper as recited in claim 3 wherein the bearing plate and the expansion plate are each formed of composite material, each comprising two substantially parallel cover skins determining a volume between the two skins, each volume being filled with foam or honeycomb, each volume being delimited by transverse walls forming stiffeners.

7. The stopper as recited in claim 3 wherein the bearing plate and the expansion plate are formed of a metal alloy.

8. The stopper as recited in claim 7 wherein the metal alloy is aluminium.

9. The stopper as recited in claim 3 wherein the bearing plate and the expansion plate are each formed of at least two panels hinged together and foldable over each other.

10. The stopper as recited in claim 9 wherein the bearing plate is formed of five panels hinged by hinges and the expansion plate is formed of three panels hinged by hinges.

11. A method of plugging an opening of a plenum of a stream generator of a pressurized water nuclear reactor comprising:
    inserting the stopper as recited in claim 1 into the opening of the plenum of the steam generator.

* * * * *